US012205539B2

(12) United States Patent
Hu

(10) Patent No.: US 12,205,539 B2
(45) Date of Patent: Jan. 21, 2025

(54) PIXEL DRIVING CIRCUIT AND MOBILE TERMINAL

(71) Applicant: TCL China Star Optoelectronics Technology Co., Ltd., Guangdong (CN)

(72) Inventor: Daobing Hu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/598,884

(22) PCT Filed: Aug. 10, 2021

(86) PCT No.: PCT/CN2021/111705
§ 371 (c)(1),
(2) Date: Sep. 28, 2021

(87) PCT Pub. No.: WO2023/010592
PCT Pub. Date: Feb. 9, 2023

(65) Prior Publication Data

US 2024/0282258 A1 Aug. 22, 2024

(30) Foreign Application Priority Data

Aug. 2, 2021 (CN) ......................... 202110880909.0

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0842* (2013.01); *G09G 2320/0233* (2013.01)

(58) Field of Classification Search
CPC ............... G09G 3/3233; G09G 3/2007; G09G 2300/0842; G09G 2320/0233
See application file for complete search history.

(56) References Cited

U.S. PATENT DOCUMENTS 6,242,870 B1 6/2001 Koyanagi et al.
2003/0122748 A1* 7/2003 Ho ....................... G09G 3/3216 345/82
2006/0027822 A1* 2/2006 Choi .................... G09G 3/3233 257/94
2007/0080908 A1* 4/2007 Nathan .................. G09G 3/325 345/77

(Continued)

FOREIGN PATENT DOCUMENTS

CN 1319039 5/2007
CN 201577223 9/2010

(Continued)

*Primary Examiner* — Premal R Patel

(57) ABSTRACT

A pixel driving circuit and a mobile terminal are provided. The pixel driving circuit includes a switch circuit, a storage circuit, and a light driving circuit. The switch circuit receives data signal applied on the data line in response to scan signal applied on the scan line. The storage circuit is charged by the data signal. The light driving circuit emits light in response to the data signal. The light driving circuit includes a driving unit, light-emitting unit, a supply voltage end, a ground end, and a voltage dividing unit that is coupled between the driving unit and the ground end.

20 Claims, 4 Drawing Sheets

(56) References Cited

U.S. PATENT DOCUMENTS

| | | | | |
|---|---|---|---|---|
| 2009/0219274 | A1* | 9/2009 | Li | G09G 3/3696 323/299 |
| 2010/0060177 | A1* | 3/2010 | Takata | H05B 45/3725 315/185 R |
| 2014/0168038 | A1 | 6/2014 | Kim | |
| 2019/0051245 | A1* | 2/2019 | Jun | G09G 3/3233 |

FOREIGN PATENT DOCUMENTS

| | | |
|---|---|---|
| CN | 101996580 | 3/2011 |
| CN | 102568373 | 7/2012 |
| CN | 108320712 | 7/2018 |
| CN | 109308878 | 2/2019 |
| CN | 109754756 | 5/2019 |
| CN | 110473496 | 11/2019 |
| CN | 110728946 | 1/2020 |
| CN | 112735341 | 4/2021 |
| CN | 112908248 | 6/2021 |
| CN | 113421499 | 9/2021 |
| JP | 2006-039544 | 2/2006 |

* cited by examiner

PIXEL DRIVING CIRCUIT AND MOBILE TERMINAL

RELATED APPLICATIONS

This application is a National Phase of PCT Patent Application No. PCT/CN2021/111705 having International filing date of Aug. 10, 2021, which claims the benefit of priority of Chinese Patent Application No. 202110880909.0 filed on Aug. 2, 2021. The contents of the above applications are all incorporated by reference as if fully set forth herein in their entirety.

FIELD AND BACKGROUND OF THE INVENTION

The present disclosure relates to a field of a display panel, more particularly, to a pixel driving circuit and a mobile terminal.

In contrast to conventional backlight, using Mini-LEDs as backlight sources shows better contrast. Currently, two transistors and one capacitor (2T1C) drive architecture is mostly used in the current Mini-LED display panel, and a light-emitting diode (LED) is a current drive device. Under this technology, the stability requirements of thin film transistor (TFT) devices are very high, especially the stability and uniformity of driving thin film transistors used to drive light emitting diodes will directly affect the brightness of light emitting diodes.

Conventionally, a Metal-Oxide-Semiconductor Field-Effect Transistor (MOSFET), hereinafter referred to as a MOS transistor, is used as a driving transistor of a pixel driving circuit. However, since MOSFET is mainly operated in a saturation region, a few change in data voltage applied on a gate of the MOSFET induces a great change in current flowing through a drain of the MOSFET. Therefore, a pixel driving circuit using the MOSFETs may not output exact current corresponding to high grey scales.

SUMMARY OF THE INVENTION

The present disclosure proposes a pixel driving circuit and a mobile terminal, effectively solving the problem that the pixel driving circuit using the MOSFETs may not output exact current corresponding to high grey scales.

According to a first aspect of the present disclosure, a pixel driving circuit used in a display panel having a scan line and a data line is provided. The pixel driving circuit includes a switch circuit, a storage circuit, and a light driving circuit. The switch circuit is configured to receive data signal applied on the data line in response to scan signal applied on the scan line. The storage circuit, electrically connected to the switch circuit, is configured to be charged by the data signal. The light driving circuit is configured to emit light in response to the data signal. The light driving circuit has a driving unit, light-emitting unit, a supply voltage end, a ground end, and a voltage dividing unit that is coupled between the driving unit and the ground end.

Preferably, the voltage dividing unit comprises a resistor of which resistance is proportional to levels of grayscales of the display panel.

Preferably, a ratio of a supply voltage fed to the pixel driving circuit and a sum of a first resistance of the resistor and a second resistance of the light-emitting unit is between values of a minimum driving current and a maximum driving current of the light-emitting unit.

Preferably, the resistors are connected in series or in parallel.

Preferably, the resistance of the resistors is ranged between 100 ohms and 300 ohms.

Preferably, storage unit comprises a capacitor coupled between the switch circuit and the ground end.

Preferably, the driving unit is a Metal Oxide Semiconductor Field Effect Transistor (MOSFET) that comprises a gate coupled to the switch circuit, a drain coupled to the supply voltage end, and a source coupled to the ground end.

Preferably, the MOSFET operates in a constant current region when the pixel driving circuit is operating.

Preferably, the light-emitting unit is coupled between the supply voltage end and the driving unit or between the driving unit and the ground end.

Preferably, the switch unit is a thin film transistor that comprises a gate coupled to the scan line, a drain coupled to the data line, and a source coupled to storage circuit and the light driving circuit. The thin film transistor is an Amorphous silicon thin film transistor or an indium gallium zinc oxide thin film transistor.

Preferably, the light unit comprises a plurality of light emitting diodes.

According to a second aspect of the present disclosure, a mobile terminal includes a pixel driving circuit, a gate driver, and a source driver. The pixel driving circuit is used in a display panel having a scan line and a data line. The pixel driving circuit includes a switch circuit, a storage circuit, and a light driving circuit. The switch circuit is configured to receive data signal applied on the data line in response to scan signal applied on the scan line. The storage circuit, electrically connected to the switch circuit, is configured to be charged by the data signal. The light driving circuit is configured to emit light in response to the data signal. The light driving circuit has a driving unit, light-emitting unit, a supply voltage end, a ground end, and a voltage dividing unit that is coupled between the driving unit and the ground end. The gate driver is connected to the scan line. The source driver is connected to the data line.

Preferably, the voltage dividing unit comprises a resistor of which resistance is proportional to levels of grayscales of the display panel.

Preferably, a ratio of a supply voltage fed to the pixel driving circuit and a sum of a first resistance of the resistor and a second resistance of the light-emitting unit is between values of a minimum driving current and a maximum driving current of the light-emitting unit.

Preferably, the resistors are connected in series or in parallel.

Preferably, the resistance of the resistors is ranged between 100 ohms and 300 ohms.

Preferably, the driving unit is a Metal Oxide Semiconductor Field Effect Transistor (MOSFET) that comprises a gate coupled to the switch circuit, a drain coupled to the supply voltage end, and a source coupled to the ground end.

Preferably, the MOSFET operates in a constant current region when the pixel driving circuit is operating.

Preferably, the light-emitting unit is coupled between the supply voltage end and the driving unit or between the driving unit and the ground end.

Preferably, the switch unit is a thin film transistor that comprises a gate coupled to the scan line, a drain coupled to the data line, and a source coupled to storage circuit and the light driving circuit. The thin film transistor is an Amorphous silicon thin film transistor or an indium gallium zinc oxide thin film transistor.

The present disclosure proposes a pixel driving circuit and a mobile terminal. The pixel driving circuit used in a display panel having a scan line and a data line is provided. The pixel driving circuit includes a switch circuit, a storage circuit, and a light driving circuit. The switch circuit is configured to receive data signal applied on the data line in response to scan signal applied on the scan line. The storage circuit, electrically connected to the switch circuit, is configured to be charged by the data signal. The light driving circuit is configured to emit light in response to the data signal. The light driving circuit has a driving unit, light-emitting unit, a supply voltage end, a ground end, and a voltage dividing unit that is coupled between the driving unit and the ground end. According to the present disclosure, the driving unit drives the light-emitting unit to emit light in response to the data signal DATA when the voltage is divided by the voltage dividing unit, so that the change in current of the light-emitting unit caused by the change of the data signal DATA received by the driving unit 14 can be reduced. The current change of the pixel driving circuit can realize the display control under high gray scales.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

Figure 1:
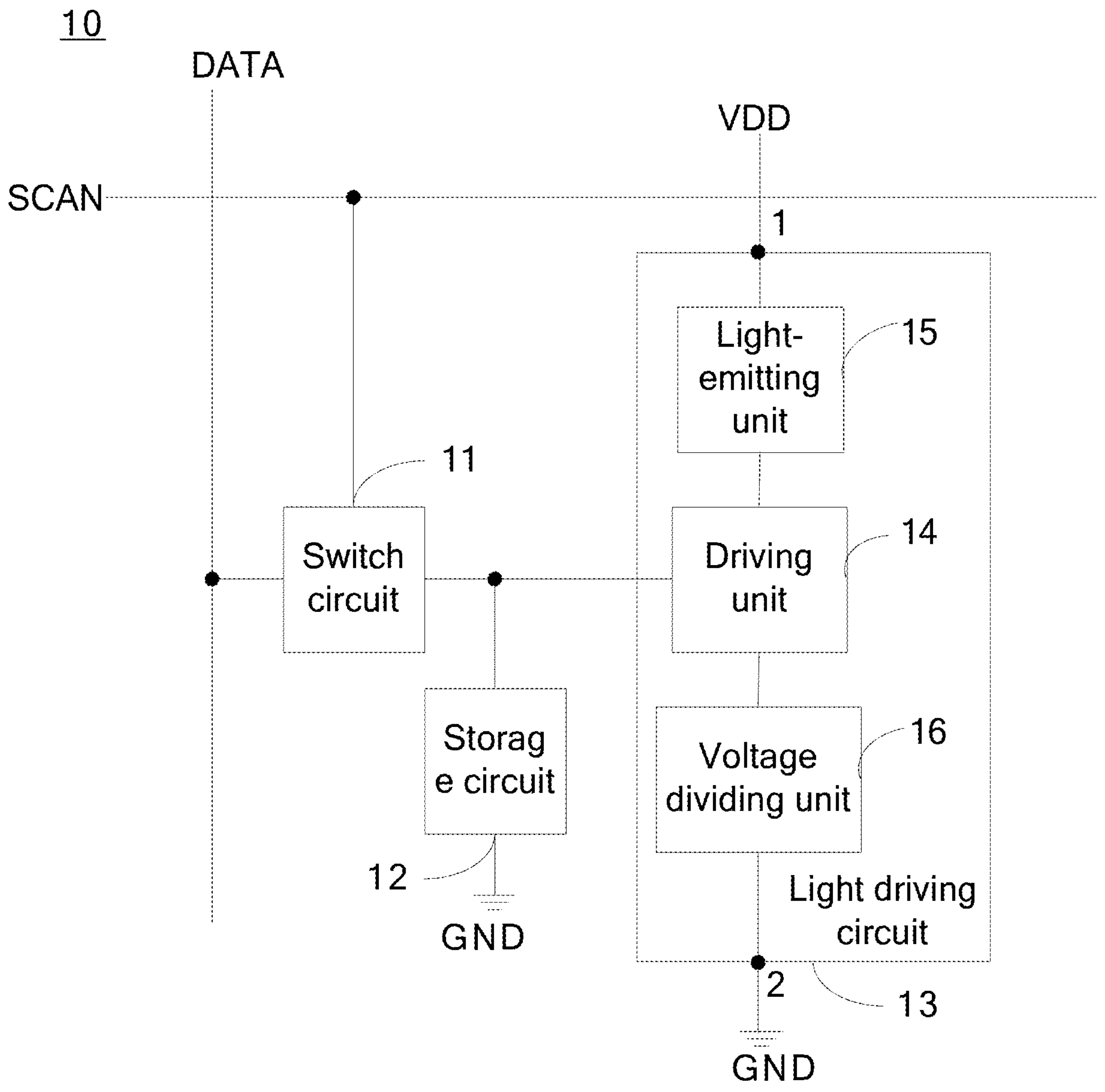
FIG. 1 illustrates a block diagram of a pixel driving circuit according to a preferred embodiment of the present disclosure.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachablely connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

The present disclosure proposes a pixel driving circuit to solve the problem that the conventional driving circuit using the MOS transistor as a driving transistor may not output exact current corresponding to high grey scales.

Please refer to FIG. 1 illustrating a block diagram of a pixel driving circuit 10 according to a preferred embodiment of the present disclosure.

The pixel driving circuit 10 is used in a display panel which includes scan lines and data lines. The pixel driving circuit 10 includes a switch circuit 11, a storage circuit coupled to the switch circuit, and a light driving circuit 13. The switch circuit 11 conducts data signal DATA applied on the data line in response to scan signal SCAN applied on the scan line. The storage circuit 12 is charged by the data signal DATA and the light driving circuit 13 is driven by the data signal DATA to emit light.

The light driving circuit 13 includes a driving unit 14, light-emitting unit 15, a supply voltage end 1, a ground end 2, and a voltage dividing unit 16 that is coupled between the driving unit 14 and the ground end 2.

In this embodiment, the voltage dividing unit 16 is connected in series between the driving unit 14 and the ground end 2. The driving unit 14 drives the light-emitting unit 15 to emit light according to the data signal DATA when the voltage is divided by the voltage dividing unit 16, so that the change in current of the light-emitting unit 15 caused by the change of the data signal DATA received by the driving unit 14 can be reduced. The current change of the pixel driving circuit 10 can realize the display control under high gray scales.

Figure 2:
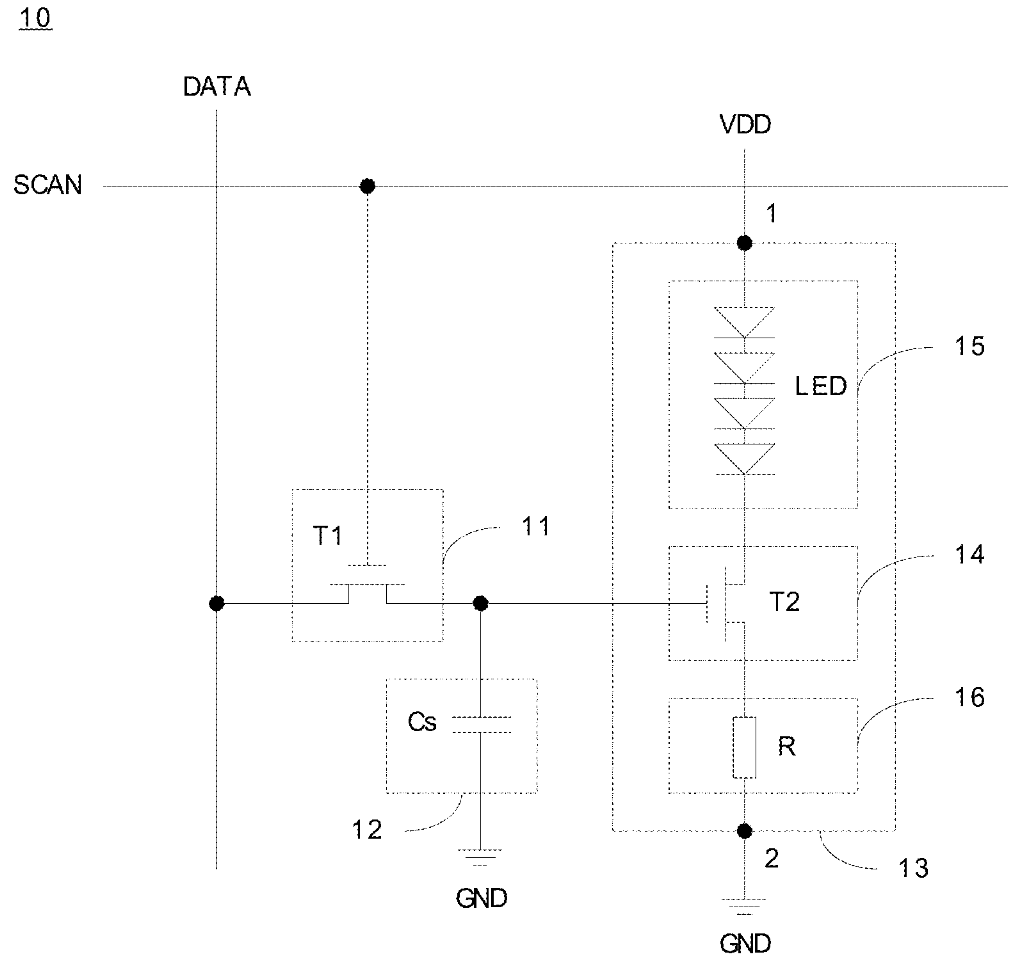
FIG. 2 illustrates a circuit diagram of the pixel driving circuit according to a preferred embodiment of the present disclosure.

Please refer to FIG. 2 illustrating a circuit diagram of the pixel driving circuit 10 according to a preferred embodiment of the present disclosure.

The switch circuit 11 includes a thin film transistor T1. The storage circuit 12 is a capacitor Cs. The driving circuit 14 is a Metal Oxide Semiconductor Field Effect Transistor (MOSFET) T2. The light-emitting unit 15 includes four light emitting diodes (LEDs). The voltage dividing unit 16 includes a resistor R.

The gate of the thin film transistor T1 is electrically connected to the scan line, the drain of the thin film transistor T1 is electrically connected to the data line, the source of the thin film transistor T1 is electrically connected to one end of the capacitor Cs and the gate of the MOS transistor T2. The thin film transistor T1 can be an amorphous silicon thin film transistor (a-Si TFT) or an indium gallium zinc oxide thin film transistor (IGZO TFT). It should be noted that in this embodiment, the switch circuit 11 only includes one thin film transistor. However, in another embodiments, the switch circuit 11 may also include multiple thin film transistors. The multiple thin film transistors may be connected in series or in parallel, and the gate of each thin film transistor is connected to the scan line. In the embodiment where multiple thin film transistors are connected in parallel, the drain of each thin film transistor is used to access the data signal DATA. In the embodiment where multiple thin film transistors are connected in series, a drain of one of thin film transistors is connected to the data signal DATA.

One end of the capacitor Cs is electrically connected to the gate of the MOS transistor T2 and the source of the thin film transistor T1, and the other end of the capacitor Cs is electrically connected to the ground end 2. In this embodiment, the storage circuit 12 includes only one capacitor. In other embodiments of the present disclosure, the storage module 12 may include multiple capacitors connected in series or in parallel. In the embodiment where multiple capacitors are connected in parallel, one end of each capacitor is electrically connected to the gate of the MOS transistor T2 and the source of the thin film transistor T1, and the other end is electrically connected to the ground end 2. In the embodiment, one end of one of the plurality of capacitors is electrically connected to the gate of the MOS transistor T2 and the source of the thin film transistor T1, and one end of the other of the plurality of capacitors is electrically connected to the ground end 2.

The gate of the MOS transistor T2 is electrically connected to the source of the thin film transistor T1 and the capacitor Cs, the drain of the MOS transistor T2 is electrically connected to the cathode of the light emitting diode LED, the source of the MOS transistor T2 is electrically connected to the resistor R. The MOS transistor T2 is used as a driving transistor in the pixel driving circuit 10. The anode of the light emitting diode LED is electrically connected to the supply voltage end 1, and the cathode of the light emitting diode LED is electrically connected to the drain of the MOS transistor T2. In this embodiment, the light-emitting unit 15 includes four LEDs connected in series. In this embodiment, the light-emitting unit 15 is connected between the supply voltage end 1 and the driving unit 14. In another embodiment, the light-emitting unit 15 may be connected between the driving unit 14 and the ground end 2.

The resistor R is connected in series between the source of the MOS transistor T2 and the ground end 2. In this embodiment, the voltage divider unit 16 includes only one resistor, and the resistance of the resistor is ranged between 100 ohms to 300 ohms. In other embodiments, the voltage dividing unit 16 may include multiple resistors, and the multiple resistors may be connected in series or in parallel.

During the operation of the pixel driving circuit 10, when the scan signal SCAN is a high-level signal, the thin film transistor T1 is turned on, and the data signal DATA is fed into the gate of the MOS transistor T2 and the capacitor Cs through the drain of the thin film transistor T1. After that, the thin film transistor T1 is turned off. Due to the storage effect of the capacitor Cs, the gate voltage of the MOS transistor T2 can still maintain the potential of the data signal DATA, so that the MOS transistor T2 is still turned on to induce driving current flowing through the MOS transistor T2 to drive the light-emitting diode LED to emit light.

Figure 3A:
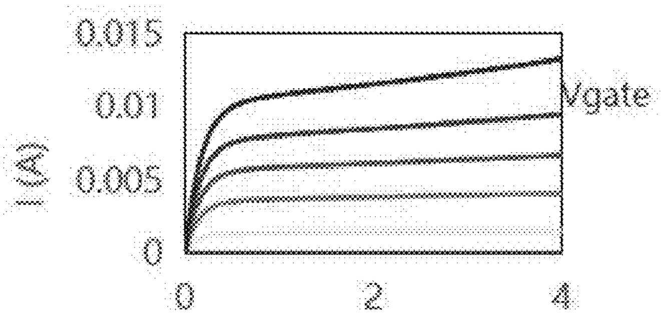
FIG. 3*a* is a characteristic curve diagram of the MOS transistor of the pixel driving circuit without the resistor R.
Figure 3B:
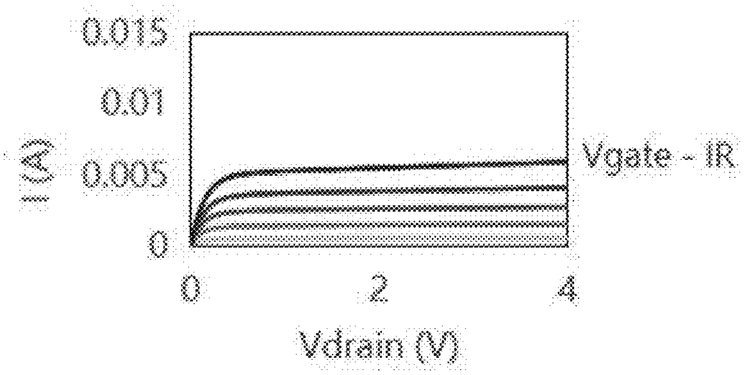
FIG. 3*b* is a characteristic curve diagram of the MOS transistor T2 of the pixel driving circuit with the resistor R.

Please refer to FIGS. 3*a* and 3*b*. FIG. 3*a* is a characteristic curve diagram of the MOS transistor T2 of the pixel driving circuit 10 without the resistor R. FIG. 3*b* is a characteristic curve diagram of the MOS transistor T2 of the pixel driving circuit 10 with the resistor R. In FIGS. 3*a* and 3*b*, x-axis represents source-drain voltage (Uds) of the MOS transistor T2, and y-axis represents source-drain current (Ids) of the MOS transistor T2. Each curve indicates: when the gate-source voltage (Vgate) of the MOS transistor T2 remains unchanged, the source-drain current (Ids) changes with the source-drain voltage (Uds). Further, given that the gate-source voltage (Vgate) of the MOS transistor T2 maintains a constant value, the MOS transistor T2 works in the constant current region (i.e., the saturation region) when the source-drain voltage (Uds) increases to a certain value. The source-drain current (Ids) no longer increases with the increase of the source-drain voltage (Uds), but tends to a certain value. Further, the greater the gate-source voltage (Vgate) of the MOS transistor T2 is, the greater the source-drain current (Ids) when it works in the constant current region is.

Figure 3C:
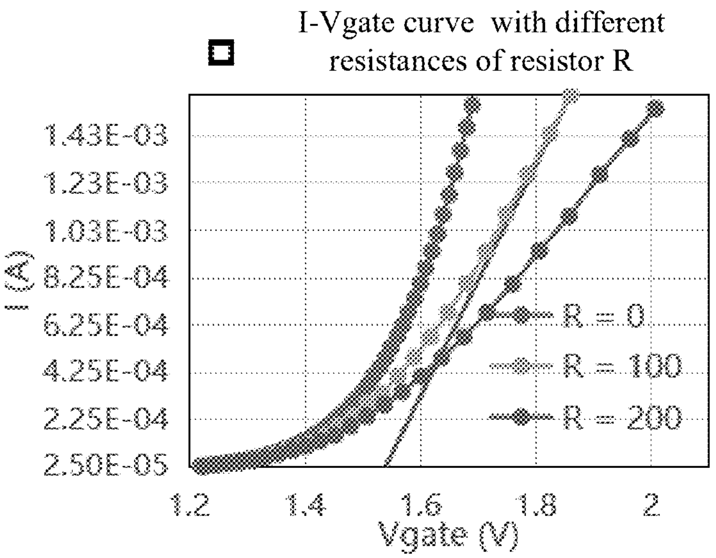
FIG. 3*c* is another characteristic curve diagram of the MOS transistor T2 of the pixel driving circuit 10 with the resistor R.

When the pixel driving circuit 10 is operating, the MOS transistor T2 works in the constant current region. At this time, in the case that there is no resistor R between the source of the MOS transistor T2 and the ground end GND, voltage (Vgate) across the gate and source of the MOS transistor T2 is "DATA-GND". High gray-scale voltage (that is, high DATA voltage) received by the pixel driving circuit 10 induces large source-drain current (Ids) which is easily exceed the maximum current allowed by the light-emitting diode LED. In addition, a small change in the voltage (Vgate) across the gate and source of the MOS transistor T2 at a larger value will induce a large change in the source-drain current (Ids). The change of the current (Ids) is not conducive to enabling the pixel driving circuit 10 to perform display control under high gray scale. In this embodiment, because the resistor R is connected in series between the source of the MOS transistor T2 and the ground end GND, when the MOS transistor T2 receives the same gray-scale voltage DATA, voltage (Vgate) across the gate and source of the MOS transistor T2 is divided and reduced to "DATA-GND-I*R", effectively reducing source-drain current (Ids). Referring to FIG. 3*c*, when the magnitude of the data signal DATA changes, the source-drain current(Ids) of the MOS transistor T2 is also correspondingly smaller, so that the pixel driving circuit 10 can be implemented display control in high grayscale.

Specifically, the number of gray levels of the display panel is proportional to the resistance of the resistor R. The higher the number of levels of gray scales of the display panel is, the greater the resistance of the resistor R is. The lower the number of levels of gray scales of the display panel is, the smaller the resistance of resistor R is.

Further, the resistor R has a first resistance $R_1$, the light emitting diode LED has a second resistance $R_2$. A ratio of the supply voltage VDD fed to the pixel driving circuit 10 and a sum of the first resistance $R_1$ of the resistor R and the second resistance $R_2$ of the light emitting diode LED is between values of a minimum driving current $I_{min}$ and a maximum driving current $I_{max}$ of the light emitting diode LED, i.e. $I_{min}<VDD/(R1+R2)<I_{max}$.

The pixel driving circuit 10 adopts a 2T1C (two transistors and one capacitor) architecture. In other embodiments, the pixel driving circuit may be 3T1C (three transistors and one capacitor), 7T1C (seven transistors and one capacitor), and so on. For example, in the 3T1C architecture, the source of a compensation transistor is connected in series to the source of the MOS transistor T2, and the gate and drain of the compensation transistor receive the sensing voltage and the reference voltage respectively.

In contrast to prior art, the present disclosure proposes the pixel driving circuit 10 used in a display panel having a scan line and a data line. The pixel driving circuit 10 includes a switch circuit 11, a storage circuit 12, and a light driving circuit 13. The switch circuit 11 is configured to receive data signal DATA applied on the data line in response to scan signal SCAN applied on the scan line. The storage circuit 12, electrically connected to the switch circuit 11, is configured to be charged by the data signal DATA. The light driving circuit 13 is configured to emit light in response to the data signal DATA. The light driving circuit 13 has a driving unit 14, a light-emitting unit 15, a supply voltage end 1, a ground end 2, and a voltage dividing unit 16 that is coupled between the driving unit 14 and the ground end 2. According to the present disclosure, the driving unit 14 drives the light-emitting unit 15 to emit light in response to the data signal DATA when the voltage is divided by the voltage dividing unit 16, so that the change in current of the light-emitting unit 15 caused by the change of the data signal DATA received by the driving unit 14 can be reduced. The current change of the pixel driving circuit 10 can realize the display control under high gray scales.

Figure 4:
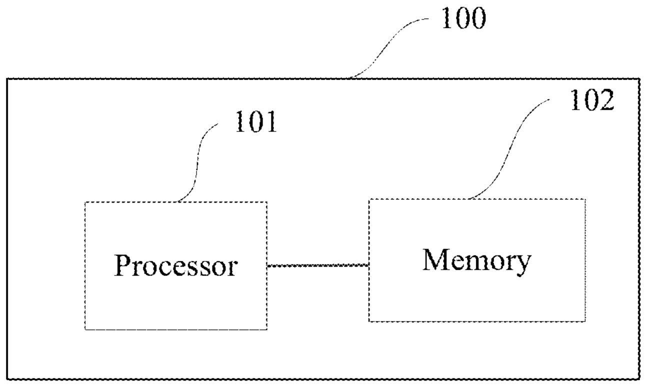
FIG. 4 illustrates a schematic diagram of a mobile terminal according to another embodiment of the present disclosure.

Please refer to FIG. 4 illustrating a schematic diagram of a mobile terminal according to another embodiment of the present disclosure. The pixel driving circuit 10 is used in the mobile terminal which can be a smart phone or a tablet computer.

The mobile terminal 100 comprises a processor 101 and a memory 102 coupled to the processor 102.

The processor 180 is a control center of the mobile terminal 100, and connects various parts of the terminal by using various interfaces and lines. By running or executing the software program and/or module stored in the memory 102, and invoking data stored in the memory 102, the processor 101 performs various functions and data processing of the mobile terminal 100, thereby performing overall monitoring on the mobile phone.

Figure 5:
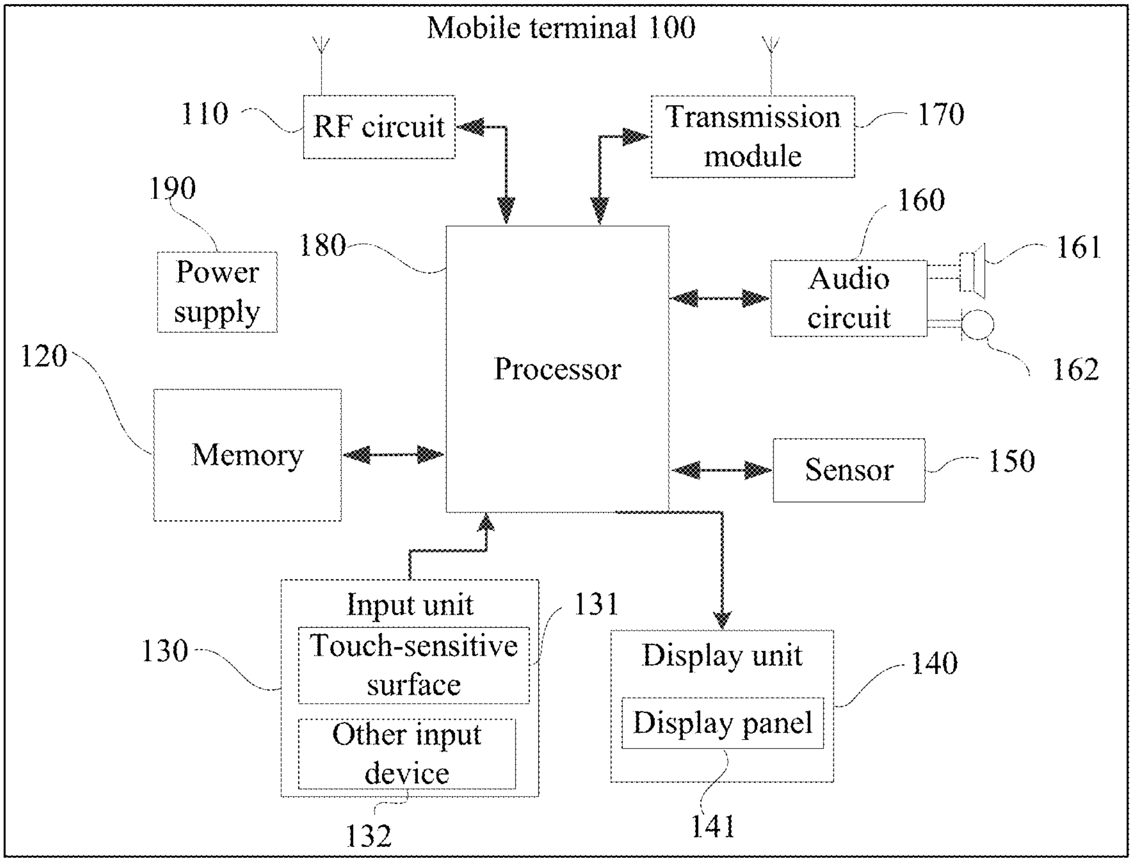
FIG. 5 is a block diagram of a mobile terminal according to one embodiment of the present disclosure.

FIG. 5 is a block diagram of a mobile terminal 100 according to one embodiment of the present disclosure. The mobile terminal 100 may be a smart phone or a tablet computer.

As shown in FIG. 5, the mobile terminal 100 may comprise components, such as a radio frequency (RF) circuit 110, a memory 120, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 100 is not limited to the structure of the mobile terminal 100 shown in FIG. 5. The mobile terminal 100 may comprise more or less components than those illustrated in the figure, or some components may be combined, or may have different components arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 100, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the mobile terminal 100. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The mobile terminal 100 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the mobile terminal 100 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal 100 are not further described herein.

The audio circuit 160, a loudspeaker 161, and a microphone 162 may provide audio interfaces between the user and the mobile terminal 100. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the mobile terminal 100.

The mobile terminal 100 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the mobile terminal 100, and can be ignored according to demands without changing the scope of the essence of the present disclosure.

The processor 180 is a control center of the mobile terminal 100, and connects various parts of the terminal by using various interfaces and lines. By running or executing the software program and/or module stored in the memory 120, and invoking data stored in the memory 120, the processor 180 performs various functions and data processing of the mobile terminal 100, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The mobile terminal 100 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the mobile terminal 100 may further include a camera (a front camera or a rear camera), a Bluetooth module, and the like, which are not further described herein. Specifically, in this embodiment, the display unit of the mobile terminal 100 is a touch screen display.

Above are embodiments of the present invention, which does not limit the scope of the present invention. Any modifications, equivalent replacements or improvements within the spirit and principles of the embodiment described above should be covered by the protected scope of the invention.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A pixel driving circuit used in a display panel having a scan line and a data line, the pixel driving circuit comprising:

a switch circuit, configured to receive data signal applied on the data line only in response to scan signal applied on the scan line;

a storage circuit, electrically connected to the switch circuit and configured to be charged by the data signal; and a light driving circuit, configured to emit light in response to the data signal, the light driving circuit having a driving unit, light-emitting unit, a supply voltage end, a ground end, and a voltage dividing unit that is coupled between the driving unit and the ground end, wherein the source of the driving unit is only connected directly to the voltage dividing unit.

2. The pixel driving circuit as claimed in claim 1, wherein the voltage dividing unit comprises one or more resistors of which resistance is proportional to levels of grayscales of the display panel.

3. The pixel driving circuit as claimed in claim 2, wherein a ratio of a supply voltage fed to the pixel driving circuit and a sum of a first resistance of the resistor and a second resistance of the light-emitting unit is between values of a minimum driving current and a maximum driving current of the light-emitting unit.

4. The pixel driving circuit as claimed in claim 2, wherein the one or more resistors includes at least two resistors, and the resistors are connected in series or in parallel.

5. The pixel driving circuit as claimed in claim 2, wherein the one or more resistors includes at least two resistors, and the resistance of the resistors is ranged between 100 ohms and 300 ohms.

6. The pixel driving circuit as claimed in claim 1, wherein storage unit comprises a capacitor coupled between the switch circuit and the ground end.

7. The pixel driving circuit as claimed in claim 1, wherein the driving unit is a Metal Oxide Semiconductor Field Effect Transistor (MOSFET) that comprises a gate coupled to the switch circuit, a drain coupled to the supply voltage end, and a source coupled to the ground end.

8. The pixel driving circuit as claimed in claim 7, wherein the MOSFET operates in a constant current region when the pixel driving circuit is operating.

9. The pixel driving circuit as claimed in claim 1, wherein the light-emitting unit is coupled between the supply voltage end and the driving unit or between the driving unit and the ground end.

10. The pixel driving circuit as claimed in claim 1, wherein the switch unit is a thin film transistor that comprises a gate coupled to the scan line, a drain coupled to the data line, and a source coupled to storage circuit and the light driving circuit, and wherein the thin film transistor is an Amorphous silicon thin film transistor or an indium gallium zinc oxide thin film transistor.

11. The pixel driving circuit as claimed in claim 1, wherein the light unit comprises a plurality of light emitting diodes.

12. A mobile terminal comprising:

a pixel driving circuit used in a display panel having a scan line and a data line, the pixel driving circuit comprising:

a switch circuit, configured to receive data signal applied on the data line in response to scan signal applied on the scan line;

a storage circuit, electrically connected to the switch circuit and configured to be charged by the data signal; and a light driving circuit, configured to emit light in response to the data signal, the light driving circuit having a driving unit, a light-emitting unit, a supply voltage end, a ground end, and a voltage dividing unit that is coupled between the driving unit and the ground end;

a gate driver, connected to the scan line; and a source driver, connected to the data line, wherein the source of the driving unit is only connected directly to the voltage dividing unit.

13. The mobile terminal as claimed in claim 12, wherein the voltage dividing unit comprises one or more resistors of which resistance is proportional to levels of grayscales of the display panel.

14. The mobile terminal as claimed in claim 13, wherein a ratio of a supply voltage fed to the pixel driving circuit and a sum of a first resistance of the resistor and a second resistance of the light-emitting unit is between values of a minimum driving current and a maximum driving current of the light-emitting unit.

15. The mobile terminal as claimed in claim 13, wherein the one or more resistors includes at least two resistors, and the resistors are connected in series or in parallel.

16. The mobile terminal as claimed in claim 13, wherein the one or more resistors includes at least two resistors, and the resistance of the resistors is ranged between 100 ohms and 300 ohms.

17. The mobile terminal as claimed in claim 12, wherein the driving unit is a Metal Oxide Semiconductor Field Effect Transistor (MOSFET) that comprises a gate coupled to the switch circuit, a drain coupled to the supply voltage end, and a source coupled to the ground end.

18. The mobile terminal as claimed in claim 17, wherein the MOSFET operates in a constant current region when the pixel driving circuit is operating.

19. The mobile terminal as claimed in claim 12, wherein the light-emitting unit is coupled between the supply voltage end and the driving unit or between the driving unit and the ground end.

20. The mobile terminal as claimed in claim 12, wherein the switch unit is a thin film transistor that comprises a gate coupled to the scan line, a drain coupled to the data line, and a source coupled to storage circuit and the light driving circuit, and wherein the thin film transistor is an Amorphous silicon thin film transistor or an indium gallium zinc oxide thin film transistor.

* * * * *